United States Patent [19]
Sass

[11] Patent Number: 5,317,321
[45] Date of Patent: May 31, 1994

[54] SITUATION AWARENESS DISPLAY DEVICE

[75] Inventor: Paul F. Sass, Freehold, N.J.

[73] Assignee: The United States of America as represented by the Secretary of the Army, Washington, D.C.

[21] Appl. No.: 85,268

[22] Filed: Jun. 25, 1993

[51] Int. Cl.$^5$ .............................................. G01S 13/00
[52] U.S. Cl. .................................. 342/176; 342/357; 364/449; 364/460
[58] Field of Search ................ 342/176, 357; 364/449, 364/460

[56] References Cited

U.S. PATENT DOCUMENTS

| | | | |
|---|---|---|---|
| 5,202,829 | 4/1993 | Geier | 364/449 |
| 5,220,509 | 6/1993 | Takemura et al. | 342/357 |
| 5,223,844 | 6/1993 | Mansell et al. | 342/357 |

Primary Examiner—Mark Hellner
Attorney, Agent, or Firm—Michael Zelenka; James A. DiGiorgio

[57] ABSTRACT

A situation awareness display device for providing a graphical display of the relative position of remote units moving along with and in proximity to the local unit utilizing the device. The device is comprised of a tracking means for determining the instantaneous position of the local unit, a communications means for communicating that local position information to cooperating remote units over an external communication link, and receiving the position information of those remote unit over that same external link, a navigation means for deriving course following information, direction and velocity of said display device from said local unit position information, a main processing means for controlling the flow of information within said device and for deriving the relative position of the remote units with respect to the local unit from their respective position information, and a display means for retrieving and graphically displaying said stored relative position information in a uniquely configured display format showing the relative positions of the remote units from the perspective of the local unit.

11 Claims, 2 Drawing Sheets

SITUATION AWARENESS DISPLAY DEVICE

GOVERNMENT INTEREST

The invention described herein may be manufactured, used and licensed by or for the Government for governmental purposes without the payment to me of any royalty thereon.

BACKGROUND OF THE INVENTION

The present invention relates to the field of communications systems, and more particularly to navigation and tracking systems that provide real-time location and relative position information of all vehicles engaged in a given activity.

Presently, there are few electronic navigation systems that provide such real-time location and position information on a global basis. These systems invariably utilize satellites as signal sources, signal relays and position references. Such satellite systems fall into one of two types; active location systems and passive location systems. An active location system is one in which the equipment aboard the user craft (local user) transmits a signal back to the satellite in response to the interrogation from the satellite to determine its position information. On the other hand, a passive system is one in which the local receiver determines its position from receiving satellite signals alone. There is no need for a receiver in a passive system to send signals back to the satellites. This allows a passive system to simultaneously service a multitude of users without the need for a high transmission capacity. Consequently, the technology has settled on passive systems for general use.

One such passive navigation system is the Global Positioning System (GPS). The GPS plans to position a total of 18-24 satellites in orbit to provide navigation information anywhere on earth. When fully implemented, this system will be a universal positioning and navigation system that can provide three dimensional position accuracies to 10 meters, velocity to an accuracy of 0.03 m/s, and time to an atomic clock accuracy. Even though it is not yet fully deployed, the GPS system is already in wide use.

The basis for the GPS's accuracy in providing position information is having a receiver that can precisely measure the transit time of signals radiated from a plurality of GPS orbiting satellites. Depending on the position information required, a GPS receiver must utilize a certain number of satellites. To determine three-dimensional position information, the receiver must utilize signals from four different satellites. But, only three satellite signals are required to obtain two-dimensional position information (i.e. latitude and longitude).

Presently, GPS receiver units are installed in a variety of devices such as airplanes, ships, ground vehicles, and hand-held portable navigation sets. These receivers calculate the position coordinates of that unit's location and display its position as an alphanumeric digital readout of latitude/longitude or Universal Transverse Mercator (UTM) coordinates. None of these prior art implementations, however, provide a graphical display of the local unit's position and the relative location of other units in proximity to the local unit from the viewpoint of that local unit.

Consequently, those skilled in the art have recognized the need for a device that can provide a relatively real-time graphical display, from the local unit's viewpoint, of the position of remote units in proximity to that local unit. Such a display is particularly advantageous in that it does not warrant the complexity, size, and cost of color computer displays that require map information to show the position of remote devices with respect to each other from the satellite's viewpoint (as opposed to the local unit's viewpoint).

This technology is valuable for both tactical military and commercial applications such as tracking trucking fleets, police or medical emergency vehicles, airplanes taxiing on runways, or military armored vehicle maneuvering in a battlefield situation (which would help prevent fratricide).

SUMMARY OF THE INVENTION

Accordingly, the general purpose of the invention is to provide a navigation and tracking device that graphically displays the relative position of units moving along with, and in proximity to, other units equipped with the same device. This purpose is achieved by utilizing a global electronic navigation system to obtain real-time location and position information, by communicating that information to cooperating units over an external communications link, by receiving the cooperating unit's information over that same external link, and by graphically displaying the relative position of the local and each cooperating unit on a simple, low cost, graphical, flat panel display.

In a preferred embodiment, a GPS receiver derives unit position information from satellite triangulations and sends that information to both a navigation processor and a main processor electrically connected to it. The navigation processor derives course following information (i.e. direction and distance) to predetermined waypoints from the derived position information, and transmits position and velocity information to the main processor and a graphical display unit consisting of a processor and a flat panel display. A programmable communications processor, responsible for sending local unit position information and receiving remote unit position information over an external communications link (not part of the invention), is also electrically connected to the main processor.

The main processor is configured to control the exchange of all information within the device. It derives the relative position of all cooperating units with respect to the local unit and stores that information in memory. Consequently, at the user's desire, the main processor automatically signals the display processor to retrieve the stored relative position information and to graphically display the position of the units on the flat panel display.

The display format, as shown in FIG. 1, is a graphical depiction, from the viewpoint of the local unit, of the relative positions of all the remote units in proximity to the local unit having its location designated as the center of the display area.

The exact nature of this invention, as well as any objects and advantages thereof, will be readily apparent from consideration of the following specification relating to the annexed drawings.

DESCRIPTION OF THE PREFERRED EMBODIMENT

Figure 2:
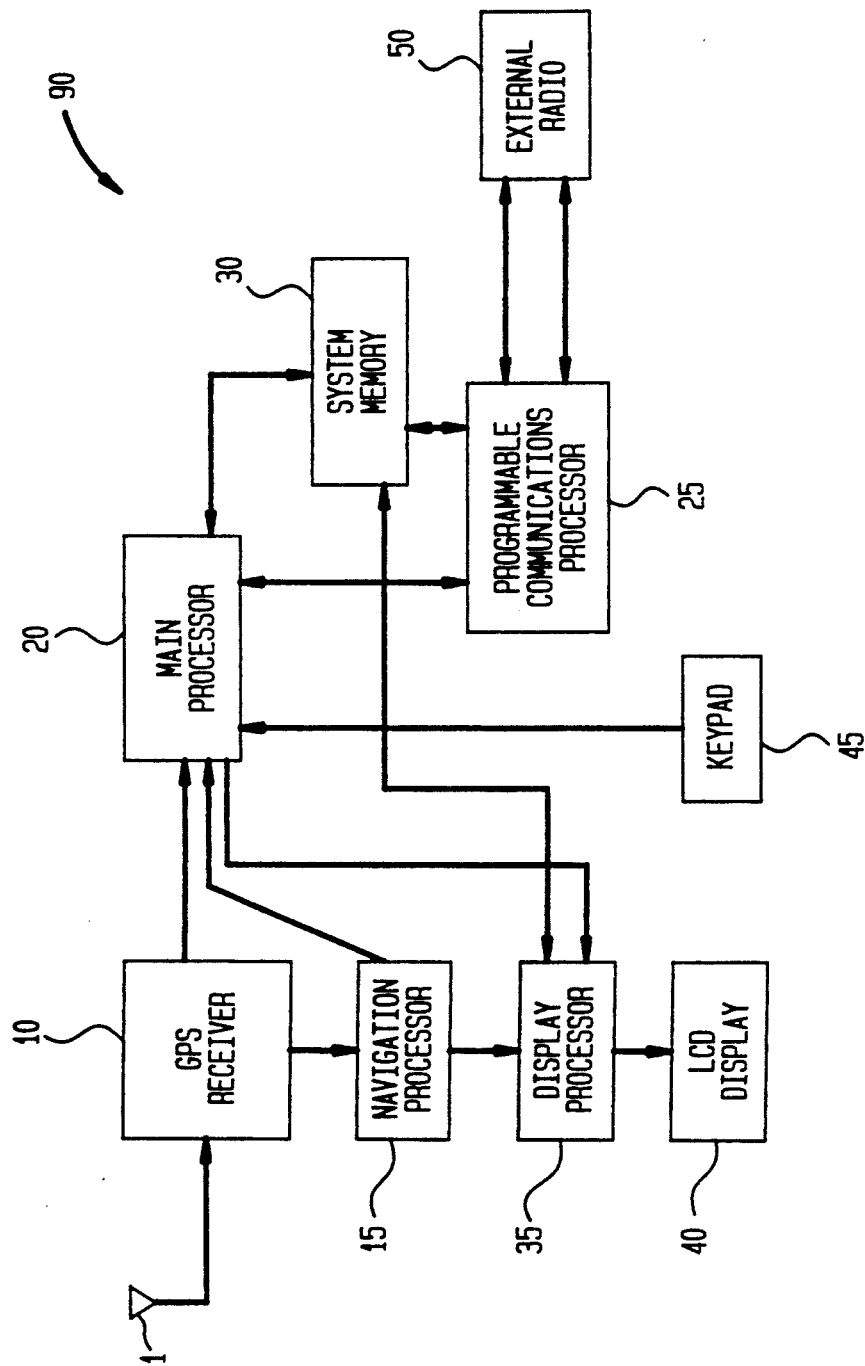
FIG. 2 shows a block diagram of the preferred embodiment of the device.

Referring now to the drawings, there is shown in FIG. 2 a block diagram of preferred embodiment 90. As shown, GPS receiver 10 is basically a stand alone device which calculates an accurate fix on the position and velocity of device 90 from triangulations made to several GPS satellites (not shown) orbiting the earth. This information is derived from signals received through external GPS antenna 1. The derived position information is transmitted to main processor 20 and navigation processor 15. (As such, receiver may be included internally or externally within device 90.)

Navigation processor 15 utilizes the position and velocity information from GPS receiver 10 to derive course following information such as the direction and distance to predetermined waypoints.

Programmable communications processor 25 controls the transmission of position and velocity reports to and from remote units (not shown) that utilize a similar device 90. For this reason, communications processor 25 implements network, channel access and signaling protocols to control the contention and "collision" of the information signals transmitted over external radio 50 (not part of invention).

An example of one such signaling protocol is described as a round robin protocol. In a round robin each of the known n units participating in the network transmits its own location at time T plus j, where j is a distinct numerical value given to each unit. Since each unit has a GPS receiver, it has an accurate measure of global time T, and all contention is thereby easily avoided.

Figure 1:
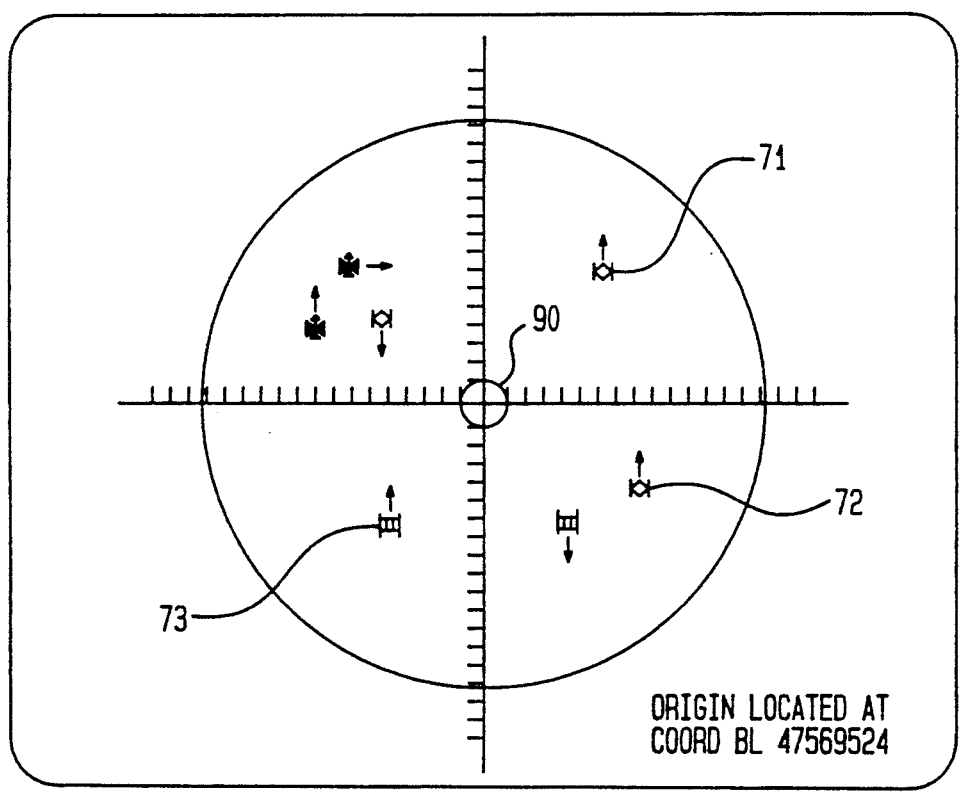
FIG. 1 shows a pictorial view of the display format of the graphical display unit.

Main processor 20 controls the exchange of information from each of the other system components and stores incoming position reports from GSP receiver 10 (providing local unit position) and communications processor 25 (providing remote unit position). Once received, the main processor stores these position reports in system memory 30 and signals the display processor 35 that the information is available and has been updated. The display processor then plots the location of remote units relative to that of the local device 90. All remote devices are shown as icons 71, 72, and 73 on flat panel graphical display 70 (see FIG. 1).

Keypad 45 is electrically connected to main processor 20 such that it provides operator control over device functions (e.g. setting the update report interval over external radio 50).

Obviously many modifications and variations of the present inventions are possible in light of the above teachings. For example, in an alternate embodiment the device may be configured without an internal GPS receiver. It may utilize a GPS receiver already present in the vehicle in which it will be implemented and installed. In this case, the device will need to communicate with the external GSP receiver through the appropriate data interface (e.g. RS-422 or RS-232).

Alternately, a stand-alone computer could be utilized to perform the device's main processing, radio communications processing and graphical display functions of the device. Moreover, such a computer could be configured to derive the local position information from an external GPS receiver unit.

In light of the above teachings, those skilled in the art will find it obvious to provide different device configurations to supply a real-time graphical display remote unit positioning in a predetermined area from the viewpoint of the local unit. It is therefore to be understood that within the scope of the appended claims, the invention may be practiced otherwise than as specifically described above.

What is claimed is:

1. A situation awareness display device, comprising:
   tracking means for determining instantaneous position information of a local unit utilizing said display device, said position information repeatedly updated at preprogrammed time intervals;
   navigation means for deriving direction and velocity of said device from said local unit position information of said tracking means, said navigation means computing progress toward a series of programmed waypoints;
   programmable communication means for transmitting said local unit position information over an external radio to remote units having their own local situation awareness display device, said programmable communication means receiving the position information of said remote units over said external radio;
   processing means for controlling the flow of information within said device, said processing means deriving the relative position of said remote units with respect to said local unit from said position information, and said processing means storing said relative position information for retrieval;
   display means for retrieving and graphically displaying said stored relative position information, said graphical display showing the relative position of remote units in relation to and from the perspective of said local unit; and
   control means for providing operator control over said display device.

2. The device of claim 1 wherein said tracking means derives said local unit position from triangulation of satellite signals.

3. The device of claim 2 wherein said tracking means comprises a Global Position Satellite (GPS) receiver, a DC power supply and an external GPS antenna.

4. The device of claim 1 wherein said navigation means comprises a navigation processor that derives local unit course following information from said position information determined by said tracking means.

5. The device of claim 1 wherein said programmable communication means comprises a programmable processor that controls the communications protocol over said external radio.

6. The device of claim 5 wherein said communications protocol includes activation control, information modulation, error detection and error correction of said external radio communications.

7. The device of claim 1 wherein said display means comprises a display processor and a graphic display panel.

8. The device of claim 7 wherein said display processor plots said local unit position at the center of center of said graphic display panel, and plots a graphical depiction of said remote units in locations relative to said local unit.

9. The device of claim 7 wherein said graphic display panel is a flat panel Liquid Crystal Display.

10. The device of claim 1 wherein said control means comprises a keyboard electrically connected to said main processor, said keyboard providing operator control of said device.

11. The device of claim 10 wherein said control means provides operator control of the update reporting interval over said external radio.

* * * * *